United States Patent
Nguyen et al.

(10) Patent No.: US 11,194,384 B2
(45) Date of Patent: Dec. 7, 2021

(54) CIRCUIT AND METHOD FOR IMPROVED BATTERY LIFE DURING SUSPEND MODE

(71) Applicant: Intel Corporation, Santa Clara, CA (US)

(72) Inventors: Timothy Nguyen, Beaverton, OR (US); Anh Khong, Beaverton, OR (US); Mingi Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 16/521,424

(22) Filed: Jul. 24, 2019

(65) Prior Publication Data
US 2019/0346913 A1 Nov. 14, 2019

(51) Int. Cl.
| G06F 1/00 | (2006.01) |
| G06F 1/3296 | (2019.01) |
| H02J 9/00 | (2006.01) |
| G05F 1/575 | (2006.01) |

(52) U.S. Cl.
CPC ............ *G06F 1/3296* (2013.01); *G05F 1/575* (2013.01); *H02J 9/005* (2013.01)

(58) Field of Classification Search
CPC ........ G06F 1/3296; H02J 9/005; G05F 1/575; Y02D 10/00
See application file for complete search history.

(56) References Cited

U.S. PATENT DOCUMENTS

| 5,811,861 | A | * | 9/1998 | Nunokawa | ........ H01L 29/41758 |
| | | | | | 257/379 |
| 9,134,742 | B2 | * | 9/2015 | Wu | .......................... G05F 1/565 |
| 9,459,642 | B2 | * | 10/2016 | Chen | ....................... G05F 1/575 |
| 9,690,366 | B2 | | 6/2017 | Read et al. | |
| 2006/0170403 | A1 | | 8/2006 | Im | |
| 2016/0320783 | A1 | * | 11/2016 | Yoshii | ....................... H03K 5/24 |
| 2017/0098997 | A1 | * | 4/2017 | Hamada | .............. H01F 17/0013 |
| 2017/0235321 | A1 | | 8/2017 | Cui | |
| 2018/0026541 | A1 | | 1/2018 | Hashimoto | |
| 2019/0271999 | A1 | * | 9/2019 | Peng | .......................... G05F 1/56 |
| 2020/0028435 | A1 | * | 1/2020 | Kim | ......................... H02M 1/14 |
| 2020/0278709 | A1 | * | 9/2020 | Azevedo | ................. G05F 1/575 |

OTHER PUBLICATIONS

Extended European Search Report dated Aug. 25, 2020 for European Patent Application No. 20164433.3, 7 pages.

* cited by examiner

*Primary Examiner* — Xuxing Chen
(74) *Attorney, Agent, or Firm* — Schwabe, Williamson & Wyatt, P.C.

(57) ABSTRACT

Circuit and method for reducing use of battery power during suspend mode operation of a computing device. Output impedance circuitry coupled to voltage regulation circuitry produces a feedback voltage and converts an output signal, produced in response to an input voltage and the feedback voltage, to an output voltage. A portion of the impedance of the output impedance circuitry is altered by control circuitry in response to a control signal, thereby causing changes in the feedback voltage, the output signal and the output voltage.

24 Claims, 4 Drawing Sheets

$$R_2 = \frac{0.6V}{V_{OUT} - 0.6V} R_1$$

$$V_{OUT} = \frac{0.6(R_1 + R_2)}{R_2}$$

| 5V Vout | R1 | R2 | | |
|---|---|---|---|---|
| 4.850 | 354200 | 50000 | | (Normal resistor values) |
| 4.766 | 350658 | 50500 | | (account for +/- 1% resistor), >4.75V (5%) |
| | | | | |
| 3.3V Vout | R1 | R2 | | |
| 3.200 | 216700 | 50000 | | (Normal resistor values) |
| 3.149 | 214533 | 50500 | | (account for +/- 1% resistor), >3.135V (5%) |
| | | | | |
| 1.05V Vout | R1 | R2 | | |
| 1.019 | 139500 | 200000 | | (Normal resistor values) |
| 1.010 | 138105 | 202000 | | (account for +/- 1% resistor), >0.9975V (5%) |

FIG. 5

| upper limit % | 2 | | 5.1 | S0 voltage value | | |
|---|---|---|---|---|---|---|
| normal voltage | | 5 | | power saved | 0.00289 | mW |
| lower limit % | 3 | | 4.85 | S0ix voltage value | | |
| upper limit % | 2 | | 3.366 | S0 voltage value | | |
| normal voltage | | 3.3 | | power saved | 0.00408 | mW |
| lower limit % | 3 | | 3.201 | S0ix voltage value | | |
| upper limit % | 2 | | 1.071 | S0 voltage value | | |
| normal voltage | | 1.05 | | power saved | 0.00113 | mW |
| lower limit % | 3 | | 1.0185 | S0ix voltage value | | |
| | | | | Total power saved | 0.00811 | mW |

FIG. 6

CIRCUIT AND METHOD FOR IMPROVED BATTERY LIFE DURING SUSPEND MODE

BACKGROUND

The present disclosure relates to use of battery power by a computing device, and in particular, to circuits and methods for reducing use of battery power during suspend mode operation of a computing device.

As more computing devices, such as personal computers (PCs), are designed for and used in mobile operating environments, power consumption and battery life become increasingly critical. While advances have been made in reducing power use during active modes of operation by the user, more attention has been focused on also minimizing power consumption during inactive modes of operation, often referred to as "suspend mode". Starting with a fully-charged battery, it is desirable that devices retain sufficient power reserves while in the suspend mode to be available for active modes operation for multiple days. Current techniques use a combination of hardware (HW), firmware (FW) and software (SW) to optimize suspend power consumption via operating methods available under the Advanced Configuration and Power Interface (ACPI) specification such as Run Time D3 (RTD3) power state. Such ACPI methods have been widely used for power optimizations and have been successful in achieving some significant reductions in power consumption, resulting in few remaining sources or techniques for further reductions

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 illustrates output voltage variations based on variations in nominal circuit resistance values according to example embodiments.

FIG. 6 illustrates examples of output voltage reductions and resulting power savings according to example embodiments.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Typical computing devices operate with system voltages normally set slightly higher than the specified operating voltage (e.g., approximately 2% above the nominal voltage) to compensate for typical and occasionally heavy power loads and the resulting voltage losses (e.g., due to current-resistance (IR) losses) during normal operational usages. However, during suspend mode when most subsystems are inactive, system voltage rails can be reduced (e.g., to approximately −3% below the nominal voltage) with minimal risks. Since minimal power loading is expected during suspend mode, voltage losses should be minimal to non-existent.

Accordingly, as discussed in more detail below, systems with such controlled voltage reductions may enable estimated power savings of 5-10 mW, which, in turn, may enable significantly greater standby battery life (e.g., greater than 12 hours of standby battery life). Further, such power savings may enable reduced battery capacity requirements, thereby resulting in reduced system cost. Such techniques may also be applied under virtually any operating system.

Operations of many newer computing device systems include various S0ix active idle states (e.g., S0i1, S0i3) designed to deliver power consumption comparable to the former S3 sleep mode, but with a faster wake-up time to return to full S0 active mode. As is known in the art, the S0ix power states represent the residency in system-on-a-chip (SoC) idle standby power states. The S0ix states shut down unused parts of the SoC and are triggered by specific conditions within the SoC (e.g., when certain components enter low power states of operation). The SoC consumes the least amount of power when in the deepest state (e.g., S0i3). Under many operating systems, an ACPI-SState represents system residency in the ACPI Suspend-to-RAM (S3), during which the system consumes the least amount of power possible.

Figure 1:
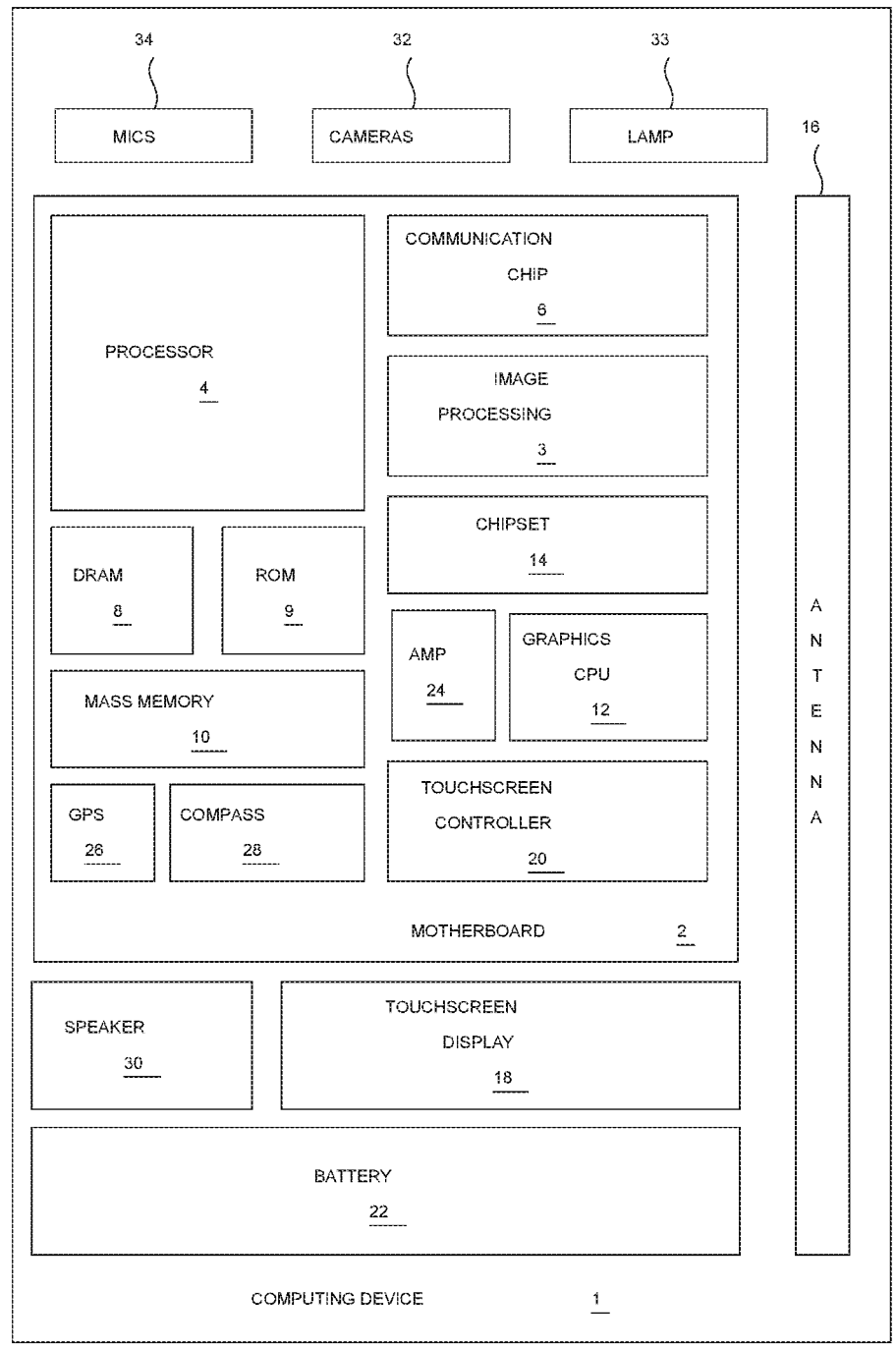
FIG. 1 illustrates a block diagram of a computing device according to example embodiments.

As discussed in more detail below, voltage regulator (VR) feedback circuitry may be added to lower the output voltage during S0iX (this requires adjustable VR controller). It can return to normal operation during S0 state. Modern standby battery life can be improved by many extra hours as a result FIG. 1 illustrates a block diagram of a computing device 1 according to example embodiments. The computing device 1 may house a system board 2 that may include a number of components, including, without limitation, to a processor 4 and at least one communication package 6. The communication package 6 may be coupled to one or more antennas 16. The processor 4 may be physically as well as electrically coupled to the board 2.

Depending on its applications, computing device 1 may include other components that may or may not be physically and electrically coupled to the board 2. These other components include, without limitation, volatile memory (e.g., DRAM) 8, non-volatile memory (e.g., ROM or BIOS) 9, flash memory (not shown), a graphics processor 12, a digital signal processor (not shown), a crypto processor (not shown), a chipset 14, an antenna 16, a display 18 (e.g., a touchscreen), a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass memory device (e.g., a hard disk drive) 10, compact disk (CD) drive (not shown), digital versatile disk (DVD) drive (not shown), and so forth. These components may be connected to the system board 2, mounted to the system board, or combined with any of the other components.

As is well known in the art, BIOS (sometimes also referred to as the System BIOS, ROM BIOS or PC BIOS) is typically non-volatile firmware used to perform hardware initialization during a system boot process (e.g., power-on startup), and to provide runtime services for operating systems and programs. The BIOS firmware is generally pre-installed on a system board and is the first software to run when the system is initially powered on. The BIOS in a modern PC initializes and tests the system hardware components and loads a boot loader from the mass memory device 10 which then initializes the operating system (OS). Most BIOS implementations are designed to work with a particular system or motherboard by interfacing with various devices that make up the complementary system chipset 14. Previously, BIOS contents were generally stored in a ROM chip on the motherboard. More recently, the BIOS contents may be stored in flash memory to enable updating or otherwise allow it to be rewritten without removing the chip from the motherboard.

The communication package 6 enables wireless and/or wired communications for the transfer of data to and from the computing device 1. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 1 may include multiple communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may contain image sensors with pixels or photodetectors, and may use resources of an image processing chip 3 to read values and also to perform exposure control, depth map determination, format conversion, coding and decoding, noise reduction and 3D mapping, etc. The processor 4 is coupled to the image processing chip to drive the processes, set parameters, etc.

In various implementations, the computing device 1 may be eyewear, a laptop, a netbook, a notebook, an ultra book, a smartphone, a tablet, a personal digital assistant (PDA), an ultra mobile PC, a mobile phone, a desktop computer, a server, a set-top box, an entertainment control unit, a digital camera, a portable music player, a digital video recorder, wearables or drones. The computing device may be fixed, portable, or wearable. In further implementations, the computing device 1 may be any other electronic device that processes data. Embodiments may be further implemented as a part of one or more memory chips, controllers, CPUs (Central Processing Unit), microchips or integrated circuits interconnected using a motherboard, an application specific integrated circuit (ASIC), and/or a field programmable gate array (FPGA).

Figure 2:
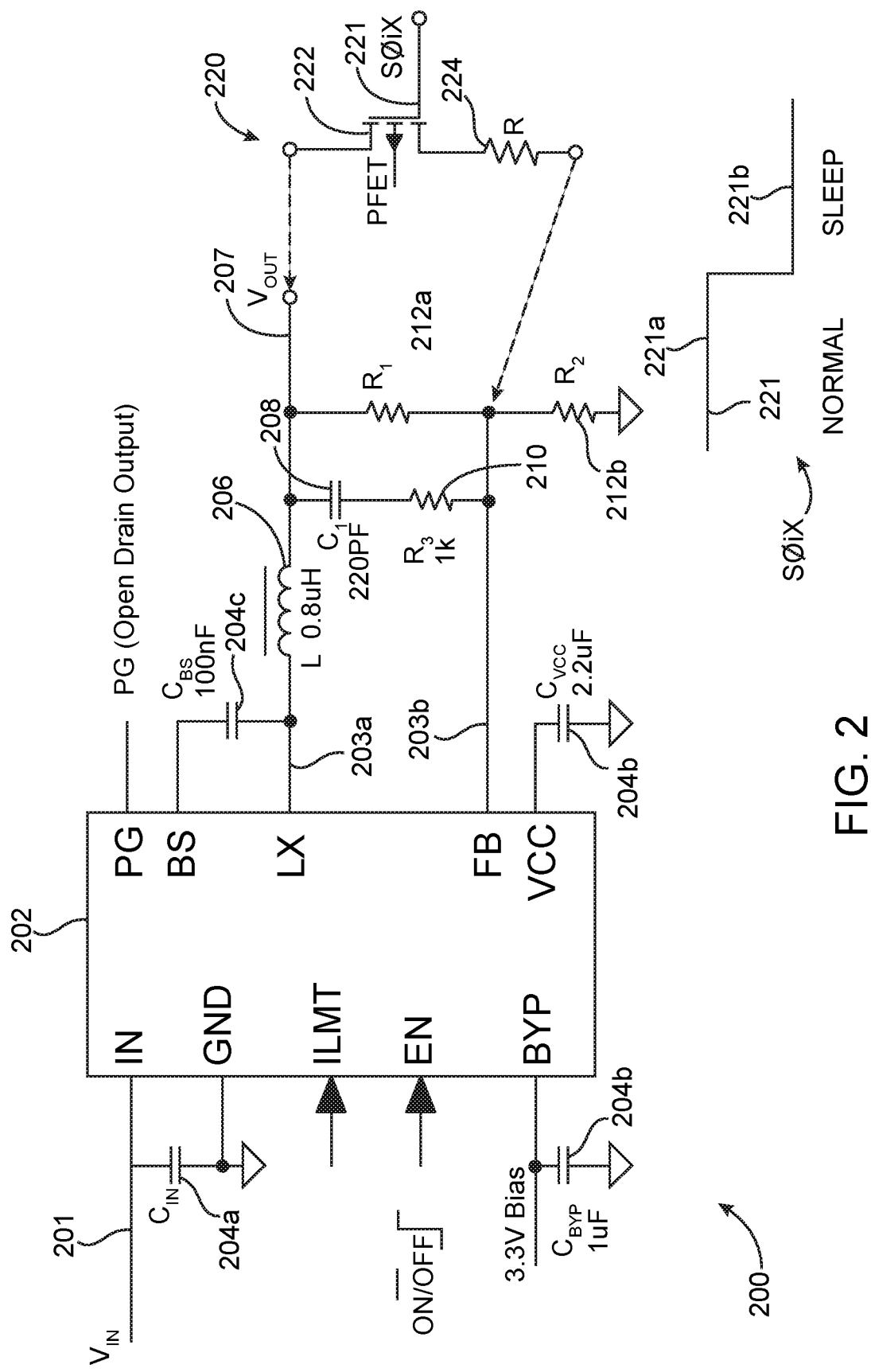
FIG. 2 illustrates a circuit schematic of voltage regulation circuitry according to example embodiments.

FIG. 2 illustrates a circuit schematic of voltage regulation circuitry 200 according to example embodiments. In accordance with known techniques, an integrated voltage regulator circuit 202 is normally used for using an applied input voltage VIN 201 (received via an input terminal or port IN) to generate and provide an output signal LX 203a (via an output terminal or port LX) corresponding to a desired regulated output voltage. In some instances, the output signal 203a may be the desired regulated output voltage. In other instances, the output signal 203a may be a pulse width modulated (PWM) signal in which the pulse widths correspond to the desired regulated output voltage. This PWM signal may be applied to output impedance circuitry, which includes low pass filter circuitry (e.g., a serial inductance L 206, a shunt capacitance C1 208 and a shunt resistance R3 210a) to filter the PWM signal and provide the regulated output voltage VOUT 207.

The output impedance circuitry further includes voltage divider circuitry (e.g., serially coupled resistances R1 212a, R2 212b) across which the resultant output voltage VOUT 207 may be applied to produce a feedback voltage 203b to be used within the voltage regulator circuit 202 (received via a feedback terminal or port FB) to provide the output signal LX 203a. Various bypass filtering capacitances CIN 204a, CBYP 204b, CBS 204c, CVCC 204d may be included to provide filtering of the input voltage VIN, an internal bypass switch voltage BYP, an internal bootstrap voltage BS and an internal power supply voltage VCC.

The output voltage 207 may be controlled by coupling control circuitry 220 across a portion of the voltage divider circuitry, e.g., across the resistance R1 212a driven by the output voltage 207. In accordance with example embodiments, the control circuitry 220 may include a switchable circuit element 222, such as an insulated gate field effect transistor (IGFET) in series with a resistance R 224. As discussed in more detail below, the control signal S0iX 221, e.g., typically provided by the processor 4 (FIG. 1), is a binary signal with a "high" state 221a (e.g., a non-asserted state) during active mode of operation, and a "low" state 221b (e.g., an asserted state) during an inactive, or "sleep", mode of operation.

Accordingly, the switchable element 222 may be a P-type FET which is normally in an "off" (non-conductive) state during the "high" signal state 221b. During the "low" signal state 221b, the P-type FET is switched to an "on" (conductive) state, thereby causing the additional resistance R to be in parallel with the upper resistance R1 of the impedance circuitry. This has the effect of modifying the VR feedback loop such as to lower the output voltage VOUT during operation of the system in S0ix (suspend) mode. Upon exit from the S0ix mode, the control circuit 220 is essentially "off" and thus allows the VR to go back to its previous higher voltage value to operate in a normal S0 mode. (As will be readily appreciated, if the asserted and non-asserted S0iX signal states are inverted, an N-type FET may be used with its position and that of the resistor R reversed.)

Figure 3:
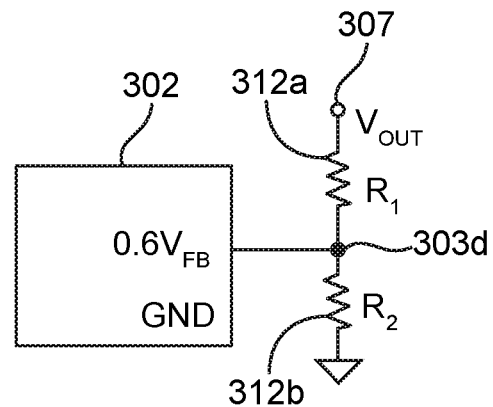
FIG. 3 illustrates computations for determining the controlled regulated output voltage and feedback circuit elements according to example embodiments.

FIG. 3 illustrates computations for determining the controlled regulated output voltage and feedback circuit elements according to example embodiments. As indicated, values for the impedance circuitry resistances 212a, 212b to achieve the desired output voltage VOUT may be easily computed. In accordance with the foregoing discussion, these computations will include computations for two effective values of the resistance R1 across which the control circuitry resistance R is coupled.

Figure 4:
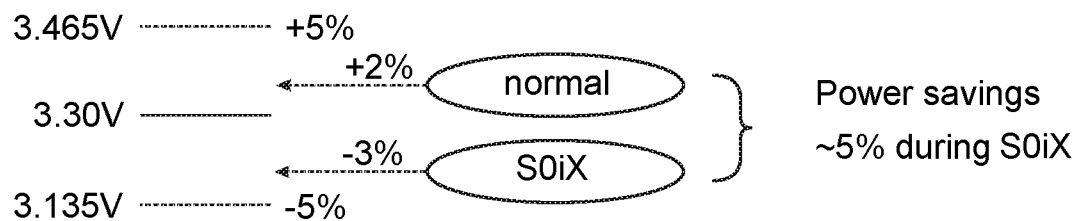
FIG. 4 illustrates nominal regulated output voltage magnitudes according to example embodiments.

FIG. 4 illustrates nominal regulated output voltage magnitudes according to example embodiments. For example, with a nominal system operating power supply voltage of 3.3 volts, the power supply may be set to provide a voltage 5% higher (3.465 volts) during S0 operating states to allow for occasional heavy loading and IR losses, and a voltage 5% lower (3.135 volts) during S0ix operating states to save battery power. (As will be readily appreciated, other power rails, e.g., 1.2V, 1.8V, etc., may also be controlled in this manner to reduce the output voltage VOUT during S0ix operating states and thereby conserve battery power as desired.)

It may be necessary to allow or compensate for manufacturing tolerances and deviations of the resistive components (e.g., typically specified to have 1% tolerances) while still allowing VR operation to remain within +/−5% of typical voltage values. For example, such tolerances may result in voltage variations as follow:

Normal operating conditions:
5V+/−5% 4.75V–5.2V (Vmin, Vmax)
3.3V+/−5% 3.135V–3.465V (Vmin, Vmax)
1.05V+/−5% 0.9975V–1.1025V (Vmin, Vmax)

FIG. 5 illustrates output voltage variations based on variations in nominal circuit resistance values according to example embodiments. For example, nominal reduced output voltage values during S0ix operating states may vary with worst case 1% resistor value deviations as shown. Hence, resulting worst case output voltages may still operate within 5% tolerances (+/−) even when the output voltage VOUT is reduced by 3% during S0ix operating states.

FIG. 6 illustrates examples of output voltage reductions and resulting power savings according to example embodiments. One may design the output voltage to be 2% above the nominal value to compensate for expected voltage losses and loadings during normal and/or heavy loads. During S0iX operating states, voltage losses should be small due to light loads; therefore, the output voltage may be further reduced, e.g., by 3%, thereby providing further power consumption savings during S0iX. For example, in order to meet 14 days of standby battery life with a 42 Whr (watt-hour) battery, a calculation for expected battery life may be:

121 mW=((42 Whr×0.97)/24 hrs per day)/14 days

With an assumption of 3% battery aging, 97% is used and 121 mW is the target S0ix system power to achieve 14 days of Modern Standby battery life.

With a current measured S0iX power of 142 mW, and an estimated current for each rail, one may reduce power consumption by approximately 8 mW during S0iX, in which case S0iX battery life may be extended as shown, thereby offering savings of:

142 mW−>11.95 days 134 mW−>12.67 days(+17 hrs longer with 8 mW saved during S0iX)

Accordingly, while the standby battery life is still less than 14 days, there is a potential life improvement of 0.72 day (8 mW saving translates into 17 additional hours) with this power saving technique.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing and following description and the following claims, the term "coupled" along with its derivatives, may be used. "Coupled" is used to indicate that two or more elements cooperate or interact with each other, but they may or may not have intervening physical or electrical components between them.

As used in the claims, unless otherwise specified, the use of the ordinal adjectives "first", "second", "third", etc., to describe a similar element, merely indicate that different instances of such elements are being recited, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of operation described herein may be changed and are not limited to the manner described herein. Moreover, actions of any operation flow need not be implemented in the order described, nor do all actions necessarily need to be performed. Also, those actions that are not dependent on other actions may be performed in parallel with the other actions.

Method examples described herein may be implemented, at least in part, with nor or more machines or computing devices. Some examples may include a computer-readable medium or machine-readable medium encoded with instructions operable to configure an electronic device to perform methods as described in the examples disclosed herein. An example implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, without limitation, hard disks, removable magnetic disks, removable optical disks (e.g., compact disks and digital video disks), magnetic cassettes, memory cards or sticks, random access memory (RAM), read only memory (ROM), and the like.

The following examples pertain to further embodiments. The various features of the different embodiments may be variously combined with some features included and others excluded to suit a variety of different applications.

Some embodiments pertain to circuitry for reducing use of battery power during suspend mode operation of a computing device, including: voltage regulation circuitry that includes an input port to receive an input voltage, a feedback port to receive a feedback voltage, and an output port to provide an output signal related to the feedback voltage; impedance circuitry coupled between the output port and the feedback port to receive the output signal, provide the feedback voltage, and provide an output voltage corresponding to the output signal and feedback voltage; and control circuitry coupled to the impedance circuitry and responsive to first and second values of a control signal by coupling first and second impedances, respectively, to the impedance circuitry; wherein the output voltage includes first and second output voltage magnitudes related to the first and second impedances, respectively.

In further embodiments, the feedback voltage includes first and second feedback voltage magnitudes related to the first and second impedances, respectively.

In further embodiments, the voltage regulation circuitry provides the output signal with first and second output signal values corresponding to the first and second feedback voltage magnitudes, respectively.

In further embodiments, the impedance circuitry includes passive circuit elements.

In further embodiments, the impedance circuitry includes reactive and resistive circuit elements.

In further embodiments, the impedance circuitry includes one or more reactive circuit elements and a plurality of resistive circuit elements, and the control circuitry includes at least another resistive circuit element coupled in parallel with at least a portion of the plurality of resistive circuit elements.

In further embodiments, responsive to the control signal representing a stand-by state, the output voltage is reduced.

In further embodiments, the output voltage is reduced to be within 5% of a nominal power rail voltage.

Some embodiments pertain to circuitry for reducing use of battery power during suspend mode operation of a computing device, including: voltage regulator means for receiving an input voltage and a feedback voltage, and in response thereto generating an output signal related to the feedback voltage; impedance means for receiving the output signal and in response thereto generating the feedback voltage and generating an output voltage corresponding to the output signal and feedback voltage; and control means for responding to first and second values of a control signal by coupling first and second impedances, respectively, to the impedance means; wherein the output voltage includes first and second output voltage magnitudes related to the first and second impedances, respectively.

In further embodiments, the feedback voltage includes first and second feedback voltage magnitudes related to the first and second impedances, respectively.

In further embodiments, the voltage regulator means generates the output signal with first and second output signal values corresponding to the first and second feedback voltage magnitudes, respectively.

In further embodiments, the impedance means includes passive circuit elements.

In further embodiments, the impedance means includes reactive and resistive circuit elements.

In further embodiments, the impedance means includes one or more reactive circuit elements and a plurality of resistive circuit elements, and the control means includes at least another resistive circuit element coupled in parallel with at least a portion of the plurality of resistive circuit elements.

In further embodiments, responsive to the control signal representing a stand-by state, the output voltage is reduced.

In further embodiments, the output voltage is reduced to be within 5% of a nominal power rail voltage.

Some embodiments pertain to a method for providing circuitry for reducing use of battery power during suspend mode operation of a computing device, including: providing voltage regulation circuitry that includes an input port to receive an input voltage, a feedback port to receive a feedback voltage, and an output port to provide an output signal related to the feedback voltage; coupling impedance circuitry between the output port and the feedback port to receive the output signal, provide the feedback voltage, and provide an output voltage corresponding to the output signal and feedback voltage; and coupling control circuitry to the impedance circuitry that is responsive to first and second values of a control signal by coupling first and second impedances, respectively, to the impedance circuitry; wherein the output voltage includes first and second output voltage magnitudes related to the first and second impedances, respectively.

In further embodiments, the feedback voltage includes first and second feedback voltage magnitudes related to the first and second impedances, respectively.

In further embodiments, the voltage regulation circuitry provides the output signal with first and second output signal values corresponding to the first and second feedback voltage magnitudes, respectively.

In further embodiments, the impedance circuitry includes passive circuit elements.

In further embodiments, the impedance circuitry includes reactive and resistive circuit elements.

In further embodiments, the impedance circuitry includes one or more reactive circuit elements and a plurality of resistive circuit elements, and the control circuitry includes at least another resistive circuit element coupled in parallel with at least a portion of the plurality of resistive circuit elements.

In further embodiments, responsive to the control signal representing a stand-by state, the output voltage is reduced.

In further embodiments, the output voltage is reduced to be within 5% of a nominal power rail voltage.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus including circuitry for reducing use of battery power during suspend mode operation of a computing device, comprising:
   voltage regulation circuitry that includes an input port to receive an input voltage, a feedback port to receive a feedback voltage, and an output port to provide an output signal related to the feedback voltage;
   impedance circuitry coupled between the output port and the feedback port to receive the output signal, provide the feedback voltage, and provide an output voltage corresponding to the output signal and feedback voltage; and
   control circuitry coupled to the impedance circuitry and responsive to first and second values of a control signal by coupling first and second impedances, respectively, to the impedance circuitry;
   wherein the output voltage includes first and second output voltage magnitudes related to the first and second impedances, respectively, and
   wherein the voltage regulation circuitry adjusts the output signal to cause the output voltage to select between the first and second output voltage magnitudes in response to the feedback voltage.

2. The apparatus of claim 1, wherein the feedback voltage includes first and second feedback voltage magnitudes related to the first and second impedances, respectively.

3. The apparatus of claim 2, wherein the voltage regulation circuitry provides the output signal with first and second output signal values corresponding to the first and second feedback voltage magnitudes, respectively.

4. The apparatus of claim 1, wherein the impedance circuitry comprises passive circuit elements.

5. The apparatus of claim 1, wherein the impedance circuitry comprises reactive and resistive circuit elements.

6. The apparatus of claim 1, wherein:
the impedance circuitry comprises one or more reactive circuit elements and a plurality of resistive circuit elements; and
the control circuitry comprises at least another resistive circuit element coupled in parallel with at least a portion of the plurality of resistive circuit elements.

7. The apparatus of claim 1, wherein, responsive to the control signal representing a stand-by state, the output voltage is reduced.

8. The apparatus of claim 7, wherein the output voltage is reduced to be within 5% of a nominal power rail voltage.

9. An apparatus including circuitry for reducing use of battery power during suspend mode operation of a computing device, comprising:
voltage regulator means for receiving an input voltage and a feedback voltage, and in response thereto generating an output signal related to the feedback voltage;
impedance means for receiving the output signal and in response thereto generating the feedback voltage and generating an output voltage corresponding to the output signal and feedback voltage; and
control means for responding to first and second values of a control signal by coupling first and second impedances, respectively, to the impedance means;
wherein the output voltage includes first and second output voltage magnitudes related to the first and second impedances, respectively, and
wherein the voltage regulator means adjusts the output signal to cause the output voltage to select between the first and second output voltage magnitudes in response to the feedback voltage.

10. The apparatus of claim 9, wherein the feedback voltage includes first and second feedback voltage magnitudes related to the first and second impedances, respectively.

11. The apparatus of claim 10, wherein the voltage regulator means generates the output signal with first and second output signal values corresponding to the first and second feedback voltage magnitudes, respectively.

12. The apparatus of claim 9, wherein the impedance means comprises passive circuit elements.

13. The apparatus of claim 9, wherein the impedance means comprises reactive and resistive circuit elements.

14. The apparatus of claim 9, wherein:
the impedance means comprises one or more reactive circuit elements and a plurality of resistive circuit elements; and
the control means comprises at least another resistive circuit element coupled in parallel with at least a portion of the plurality of resistive circuit elements.

15. The apparatus of claim 9, wherein, responsive to the control signal representing a stand-by state, the output voltage is reduced.

16. The apparatus of claim 15, wherein the output voltage is reduced to be within 5% of a nominal power rail voltage.

17. A method for providing circuitry for reducing use of battery power during suspend mode operation of a computing device, comprising:
providing voltage regulation circuitry that includes an input port to receive an input voltage, a feedback port to receive a feedback voltage, and an output port to provide an output signal related to the feedback voltage;
coupling impedance circuitry between the output port and the feedback port to receive the output signal, provide the feedback voltage, and provide an output voltage corresponding to the output signal and feedback voltage; and
coupling control circuitry to the impedance circuitry that is responsive to first and second values of a control signal by coupling first and second impedances, respectively, to the impedance circuitry;
wherein the output voltage includes first and second output voltage magnitudes related to the first and second impedances, respectively, and
wherein the voltage regulation circuitry adjusts the output signal to cause the output voltage to select between the first and second output voltage magnitudes in response to the feedback voltage.

18. The method of claim 17, wherein the feedback voltage includes first and second feedback voltage magnitudes related to the first and second impedances, respectively.

19. The method of claim 18, wherein the voltage regulation circuitry provides the output signal with first and second output signal values corresponding to the first and second feedback voltage magnitudes, respectively.

20. The method of claim 17, wherein the impedance circuitry comprises passive circuit elements.

21. The method of claim 17, wherein the impedance circuitry comprises reactive and resistive circuit elements.

22. The method of claim 17, wherein:
the impedance circuitry comprises one or more reactive circuit elements and a plurality of resistive circuit elements; and
the control circuitry comprises at least another resistive circuit element coupled in parallel with at least a portion of the plurality of resistive circuit elements.

23. The apparatus of claim 17, wherein, responsive to the control signal representing a stand-by state, the output voltage is reduced.

24. The apparatus of claim 23, wherein the output voltage is reduced to be within 5% of a nominal power rail voltage.

* * * * *